United States Patent
Lugowski et al.

(10) Patent No.: US 7,736,511 B2
(45) Date of Patent: Jun. 15, 2010

(54) FEEDBACK SYSTEM FOR ENHANCING ELIMINATION OF BIOMASS IN SEWAGE SLUDGE

(75) Inventors: Andrew Jerry Lugowski, Toronto (CA); George Fouad Nakhla, Woodbridge (CA); Ajay Singh, Milton (CA); Owen Patrick Ward, Waterloo (CA); Frederick Alan Mosher, Petersburg (CA)

(73) Assignee: Lystek International Inc., Waterloo, Ontario (CA)

( * ) Notice: Subject to any disclaimer, the term of this patent is extended or adjusted under 35 U.S.C. 154(b) by 0 days.

(21) Appl. No.: 12/249,001

(22) Filed: Oct. 10, 2008

(65) Prior Publication Data

US 2010/0089823 A1    Apr. 15, 2010

(51) Int. Cl.
  *C02F 3/30*    (2006.01)
(52) U.S. Cl. .................. 210/603; 210/605; 210/613; 210/623; 210/630
(58) Field of Classification Search .............. 210/601, 210/603, 605, 612, 613, 623, 630, 631
  See application file for complete search history.

(56) References Cited

U.S. PATENT DOCUMENTS

| | | | | |
|---|---|---|---|---|
| 4,443,337 A | * | 4/1984 | Otani et al. | 210/602 |
| 4,460,470 A | * | 7/1984 | Reimann | 210/605 |
| 5,846,425 A | * | 12/1998 | Whiteman | 210/606 |
| 5,851,404 A | * | 12/1998 | Christy et al. | 210/723 |
| 6,808,636 B2 | * | 10/2004 | Ward et al. | 210/710 |
| 2002/0185456 A1 | * | 12/2002 | Ward et al. | 210/766 |
| 2005/0040103 A1 | * | 2/2005 | Abu-Orf et al. | 210/603 |

* cited by examiner

Primary Examiner—Fred Prince
(74) Attorney, Agent, or Firm—Anthony Asquith Corp

(57) ABSTRACT

Already-treated sludge is fed back into incoming sewage, and is effective to supply nutrients needed for the microbiological breakdown of the sludge. The feedback sludge has a solids content of 10% or more, and has been sheared and heated to drive its viscosity down to 10,000 cP or less. In sludge done that way, nutrients are preserved and presented to the sewage to be treated in highly liquidized and solubilized form, whereby the nutrients are very bio-available to the microbes in the sewage. Large improvements in the elimination of biomass can result.

11 Claims, 4 Drawing Sheets

FEEDBACK SYSTEM FOR ENHANCING ELIMINATION OF BIOMASS IN SEWAGE SLUDGE

One of the desired functions of a municipal wastewater treatment plant is to separate solids from liquids, whereby the water in the sewage can be returned to the local water system, leaving a quantity of sludge to be disposed of. Desirably, the plant operates to minimise the amount of sludge, subject to the economics of the apparatus and procedures available for doing so.

Typically, the sludge material produced by a municipal sewage treatment plant, prior to the sludge being processed for disposal, is e.g. 6% solids (i.e. 94% liquids). Thus, each tonne of sludge contains 60 kg of solids and 940 kg of water.

Of the 60 kg of incoming solids, typically 45 kg is organic, and the other 15 kg is inorganic or non-organic.

In a typical conventional sewage treatment plant, out of the 940 kg of the water in each tonne of sewage sludge, approximately 640 kg of that 940 kg of water is separated and is returned to the upstream stations of the plant, or is discharged into the local water system. The remaining 300 kg of water, together with what remains of the solids, is contained in the sludge to be disposed of. Typically, the non-organic solids-content remains fairly constant, while the biomass content of the sludge is reduced. The reduction of the biomass occurs as a result of microbiological processes, in which the biomass is transformed into e.g. carbon dioxide.

Typically, the traditional sludge to be disposed of has a solids content of a little under 10% (i.e. a water content a little over 90%). Disposal of the sludge can be done, for example, in a landfill, by spreading the sludge on agricultural fields, by incinerating it, etc.

One of the aims of the technology described herein is to enhance the elimination of the biomass component of sewage, and thus to reduce the amount of the sludge to be disposed of. Corresponding to the above exemplary figures, per tonne of incoming sewage, where the conventional treatment system might reduce the organic biomass from 20 kg down to e.g. 12 kg, it is an especial aim herein to reduce the biomass from 20 kg down to e.g. 5 kg. (Note that, of course, it is always possible to reduce biomass, where the cost of using resources and of time spent are of no concern; so another aim is to effect the improvement in biomass elimination without imposing a need for increased processing time, nor extra on-going use of resources, nor expensive extra equipment.)

Apart from the significant savings attributable to destroying some of the biomass of the sludge, it is noted that another effect of the described technology is to allow the sludge to be dewatered to a higher solids-content. The described technology is effective to liquefy or liquidise the sludge; thus the technology is effective to allow the sludge to be dewatered to e.g. 20% total solids or more, and yet the resulting sludge still can still be liquid enough to be as easily handled (by being pumped) as conventional sludge is at 12%.

Thus, the combination of the reduced biomass and the allowed increase in solids-percentage, together, can reduce the amount of sludge to be disposed of, per tonne of 6%-solids sludge, at least theoretically, actually by as much as eighty-five percent.

It will be understood that the above-mentioned numbers are examples, and typical values, and are not intended as limitations. The numbers are provided for the purpose of illustrating that the technology described herein, when engineered properly, can enable very worthwhile reductions and savings to be made in the amount of sludge to be disposed of.

Some Aspects of the New Technology

The manner in which the reduction in biomass in the sewage sludge is effected, in the new technology, will now be explained.

The technology described herein is related to that shown in patent publication CA-2,606,506. In that publication, there is described a synergistic combination of procedural elements for treating sludge. The procedural elements include heating the sludge, raising the pH of the sludge, and violently shearing the sludge.

A biological cell, within a body of raw sewage, includes a basically-liquid internal cytoplasm and a basically-not-liquid cell wall. When the cell is torn open, as it is by violent shearing, the liquids of the cytoplasm are readily released, and they readily go into solution in the water of the sewage, particularly if the sewage is at a raised temperature and a raised pH at the time. The cell walls, on the other hand, do not readily go into solution. Traditionally, the cell-wall material could only be made to go into solution by heating the sewage to an unduly high temperature (such as 180 deg C.), and/or by raising the pH of the sewage to an unduly high level (such as pH-13). The '506 technology, however, by combining heating and pH-raising with violent shearing, enables the cell wall material to become solubilised (i.e. to go into solution) at a much lower temperature and pH.

One effect of treating sewage sludge with the '506 synergistic combination of raised temperature, raised pH, and shearing, is to cause the sludge to become liquidised. A traditional sludge at 12% solids is stiff and sticky and difficult to handle, and cannot be characterised as homogeneous. Subjecting the sludge to the synergistic combination can cause a 12%-solids sludge to be liquidised to a viscosity as low as e.g. 5,000 cP—at which the sludge is very pumpable and easy to handle. A traditional sludge that has been de-watered to 20% solids is substantially dry and cake-like; yet a 20%-solids sludge can be liquidised, by using the '506 combination of procedural elements, to a viscosity of e.g. 10,000 cP or lower.

Thus, the effect of the '506 synergistic combination is to cause the sludge to become highly homogeneous and the viscosity of the sludge to be significantly lowered. In a sludge prepared according to '506, (almost) all the constituents of the biomass content of the sludge are solubilised. Thus, the material of the cell walls now take the form of e.g. soluble carbohydrates, protein, and other organic molecules. Thus, also, the liquidised sludge contains (almost) all the materials and nutrients that were present in the biological cells in (almost) wholly liquid form.

On the other hand, another of the effects of the '506 synergistic combination is to destroy whatever colonies of microbes might be present in the sludge. Sludge that has been liquidised by being subjected to the '506 synergistic combination of procedural elements can be regarded, as far as viable colonies of microbes are concerned, as virtually sterile.

It has been common practice, in sewage treatment systems, to engineer a feedback of partially (or fully) treated sludge, by mixing a portion of the treated sludge with incoming raw sewage. The partially or fully treated sludge contains viable colonies of microbes, and the intent has been to activate the incoming sewage with microbe colonies, i.e. with colonies of microbes of the exact kind that will be most efficacious in breaking down the organic materials in the sewage.

Thus, adding treated sludge that has been rendered (almost) sterile (as is the case with sludge that has been treated in accordance with CA-2,606,506), into the incoming raw sewage, might be regarded as contra-indicated.

However, it is recognised that such is not the case. Because the liquidised sludge is a low-viscosity homogeneous liquid, in which the biomass has been (almost) wholly solubilised, the liquidised sludge added into the incoming sewage serves as a highly bio-available source of biological nutrients for the microbiological digestive processes and for assimilation of the nutrients into the microbe colonies.

(This assumes, of course, that there are at least some microbes of the advantageous types already present in the incoming sewage—because, as mentioned, there are substantially no viable colonies of microbes left in sludge that has been through the '506 combination of procedures. Again, this may be contrasted with the traditional systems, in which the feedback of aerobically-activated sludge, where that has been practised, has been done mainly for the purpose of importing microbe colonies into the sewage being treated, on the basis that such colonies might not be viable or established in the sewage.)

Thus, adding a quantity of a '506 sludge into incoming raw sewage cannot and does not directly serve actually to establish the required colonies of the most advantageous microbes. Rather, adding a quantity of a '506 sludge into incoming sewage is aimed at being effective to present such microbe colonies as are already present with the very nutrients that are necessary for the growth of the microbes that are best suited to breaking down that particular sewage. And, not only is the sewage presented with the very nutrients needed to foster the most effective microbes, but the sewage is also presented with those nutrients in the form of a concentrated homogeneous liquid, i.e. in a form in which ample quantities of the nutrients can easily pass through cell membranes and be assimilated by the microbes. Solubilised nutrients are very readily bio-available. Thus, the addition of even small quantities of '506 sludge—in effect the addition of the right nutrients and the presentation of those nutrients to the microbes in the most advantageous manner—can cause the microbe populations to thrive and flourish.

In fact, it can be possible to add too much of the '506 sludge into the incoming sewage, in that the sudden addition of too much of just the right nutrients, in just the most readily assimilable manner, can cause a toxic-shock-like effect, which can stall and inhibit the development of the microbes, at least for a time.

Thus the effect of adding a (small) quantity of a '506 sludge into incoming sewage sludge is to cause the microbial breakdown reactions operating on the incoming sewage to proceed at a significantly faster rate, and to proceed significantly more thoroughly than in the traditional systems. The microbe colonies are presented with the nutrients they need, in a manner which enables the colonies rapidly to become established and to thrive. The microbes consume the biomass in the sewage, transforming the biomass into carbon dioxide.

The benefits that come from adding nutrients to the incoming sewage sludge in the said concentrated and easily-assimilable form are hardly less present also when the microbial reactions are anoxic. Now, it is the facultative microbes that thrive, and they convert the biomass mainly into nitrogen and methane, thereby reducing oxygen demand and biomass production—but the rate and thoroughness with which they do this is still much greater than in the corresponding traditional anoxic system, where the required nutrients either are not present in the sewage—or, though present, are not readily bio-available.

In some treatment systems, it can be beneficial to add the easily-assimilable concentrated nutrients (i.e. to add small quantities of the '506 sludge) to an anoxic phase. In fact, adding the prepared feedback sludge containing the right nutrients, in the most advantageous solubilised form, can be beneficial, in general, in other situations where it is desired to promote the viability and vigour of microbial colonies.

The technology will now be further described with reference to the accompanying drawings, in which.

The scope of the patent protection being sought herein is limited by the words of the accompanying claims.

Figure 1:
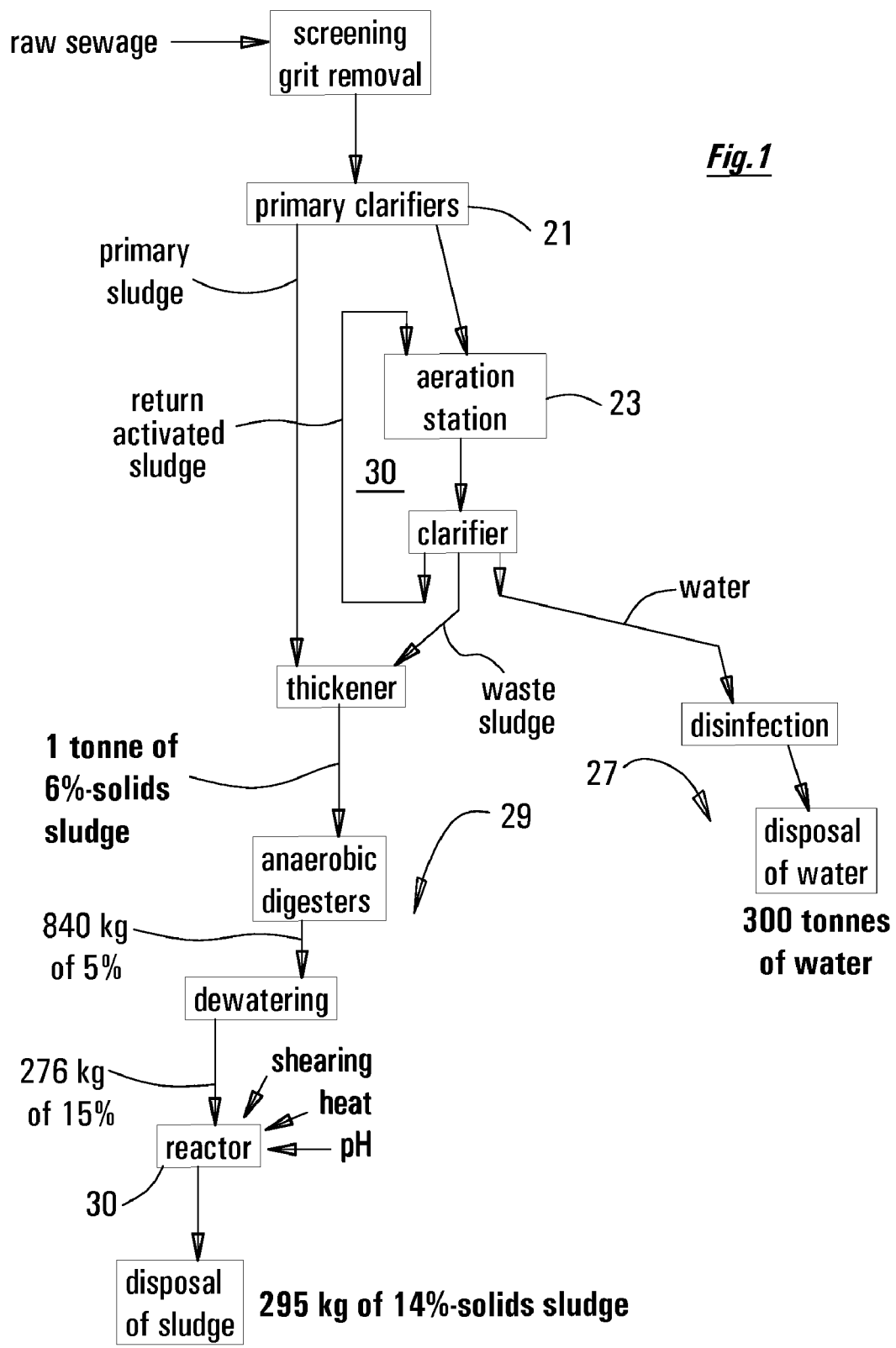
FIG. 1 is a diagram showing the items of equipment in a typical conventional municipal sewage treatment plant, and showing the procedures applied to sewage water passing through that plant.

In FIG. 1 sewage enters the primary clarifiers 21. The incoming sewage is very watery. The thickener station of the plant of FIG. 1 generates one tonne of sludge, and that amount of sludge is derived from e.g. three hundred tonnes of raw watery sewage.

The watery fraction of the treated sewage, having been separated from the sludge, passes down a water-discharge-path 27 where it is disinfected, etc, and the water then passes out of the treatment plant for disposal (into groundwater, a river, etc). The sludge that remains passes down a sludge-discharge-path 29. The sludge then needs to be disposed of, e.g. by incineration, landfilling, spreading on agricultural fields, etc. Depending on its destiny, the sludge might need to be further processed (e.g. liquidised, dried, etc), and such further processing can be carried out at the treatment plant or elsewhere. In FIG. 1, the sludge passes through a reactor 30, which is of the kind as described in patent publication CA-2, 606,506. Here, the temperature of the sludge, and its pH, are maintained at elevated values, and the sludge is subjected to violent shearing.

FIG. 1 illustrates a traditional conventional feedback-loop 30. Here, a quantity of the discharged sludge, now activated with colonies of microbial organisms, is fed back into the aeration station 21. The activated sludge, with its established microbe population, is added to the incoming sewage, and serves to improve the speed and thoroughness of the microbial breakdown reactions. In a conventional treatment plant, it is conventional to return fractions of the water or sludge from some of the processing stations back to other stations upstream. Only one such feedback loop is shown (at 30) FIG. 1, but others will be understood by the skilled designers.

Figure 2:
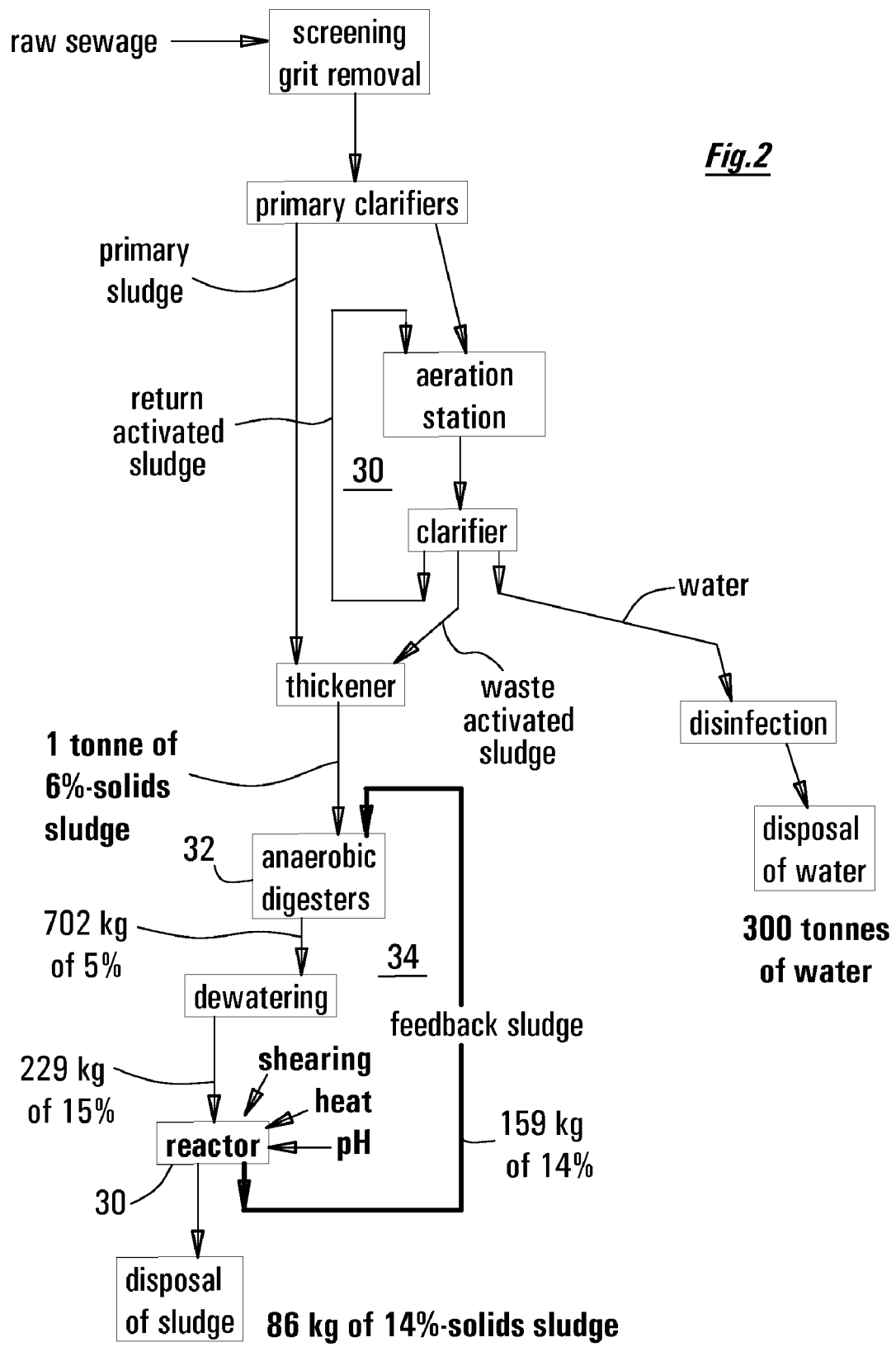
FIG. 2 is similar to FIG. 1, with the addition of further items of equipment, and further procedures applied to the sewage sludge, in accordance with the present technology.

The treatment plant of FIG. 1 may be regarded as conventional. FIG. 2 shows the addition of another feedback-loop 34. Here, a fraction of the sludge emerging from the reactor 30 is fed back into the anaerobic digesters 32. The reactor 30 is provided with a heater, a shearing facility, and a means for raising the pH of the sludge inside the reactor. These facilities, being conventional in themselves, will not be described further. Their effect is to liquidise sludge and to solubilise the biomass thereof.

The treated sludge that enters the reactor 30 is de-watered to at least 10% solids. Then, the thickened sludge is placed in the reactor 30. (Treatment in the reactor can be done on a continuous, semi-continuous, or batch basis.) Heat is applied to the sludge in the reactor, to bring its temperature up to at least 60 deg C. If needed, the pH of the sludge in the reactor is also raised (e.g. by adding suitable alkali salts into the reactor).

The sludge in the reactor 30 is sheared (preferably while the sludge is maintained at the raised temperature and pH) by the use of a shearing apparatus associated with the reactor, typically powered by an electric motor. Shearing is applied to the sludge in the reactor with sufficient power, and is continued for a long enough period of time, that the sludge in the reactor emerges as a homogeneous liquid.

In the present technology, a fraction of the liquidised sludge, from the shearing reactor 30, is fed back (returned, recycled, etc) into an upstream processing station of the treatment plant. In the example, the liquidised sludge from the reactor is fed back into e.g. the anaerobic digester station. The liquidised sludge can also be fed back into the aeration station 23. It is recognised that the sludge emerging from the reactor, to be suitable as a feedback substance, should have certain properties. To be suitable for use as feedback substance, in the present technology, the sludge emerging from the reactor should sufficiently solubilised that it is characterised as a homogeneous liquid, having the consistency of thick oil or cream. That is to say, the liquid—if a sample of it were to be contained in a jar—should be capable of settling quickly to its own level, and the liquid should be capable of being poured readily from the jar, upon the jar being tipped. The material would be regarded as too stiff (i.e. too viscous) if, when the jar was tipped, the material remained in the jar without moving. In that case, the material would be characterised rather as a paste than as a liquid, and a paste is too thick and viscous to be useful to achieve the beneficial effects as described herein. The sludge should be sufficiently-thoroughly processed, in the reactor, that the emergent liquidised sludge can reasonably be characterised, not as a paste or a gel, but as a pourable liquid.

The sludge may be regarded as having been sufficiently liquidised if the viscosity of the sludge has been reduced to about 10,000 centiPoise, or less. (The operators might wish to liquidise the sludge below 10,000 cP for other purposes, e.g. to do with the disposal of the sludge—but further liquefaction is not needed for the present purpose of preparing the sludge for use as a feedback-substance.)

The plant operators should see to it that the level to which the sludge is dewatered (given that the sludge preferably should be dewatered to 10%-solids or more), and the heating, pH, and shearing power, are such that the sludge does indeed emerge from the reactor as a liquid having a viscosity of 10,000 cP or less. In some cases, for example, the temperature of the sludge might have to be raised above 60 deg C. In other cases, sludge that has been dewatered to 10%-solids sludge can be liquidised to below 10,000 cP without the need for its pH to be raised, and in those cases no alkali salts need be added (unless, for example, the sludge is destined to be used as a fertiliser, in which case a raised pH might be advantageous.)

As mentioned, shearing rips open the biological cells. Then, a hydrolysis process reconstitutes the bonds in the exposed polymer molecules, and breaks them down, whereby the organic components readily enter solution. Thus, the sludge should be de-watered to at least 10%-solids, prior to being sheared—below 10%-solids, only a minimal amount of shearing would be needed to drive the viscosity of the sludge below 10,000 cP—which might not be enough to liquidise the sludge properly. Also, although low-solids sludge can be very liquid, the liquid might not be homogeneous, at least not the extent that the liquid is homogeneous when the sludge has been subjected to prolonged violent shearing.

The amount of liquidised sludge from the reactor that is to be fed back may be expressed in terms of the ratio of the amount of biomass in the reactor sludge to the amount of organic substrate in the incoming sewage. In this specification, the amount of the biomass in sludge is measured as the dry-weight of the biomass, which can be determined by the conventional technique of measuring what remains after all the water in the sludge has been driven off, in a purpose-made laboratory apparatus. The ratio of the organic content of the donor feedback-substance to the organic content of the receiver may be measured as a simple ratio of two masses, or as a ratio of flowrates if the treatment is being done on a continuous basis.

As mentioned, the liquefied or liquidised sludge contains the nutrients needed by the microbe colonies, and presents the nutrients to the incoming sewage awaiting treatment in a manner that makes the nutrients extremely bio-available. In fact, as mentioned, the nutrients in the donated reactor-sludge are presented to the receiving sewage in such a hugely-advantageous manner that donating too large a quantity of reactor-sludge can shock the sewage, and can actually inhibit viability and growth of the microbe colonies therein. Thus, the amount of donated reactor-sludge fed back into the incoming sewage should be as much as possible, subject to the limitation of avoiding the toxic-shock effect. (Possibly, the toxic-shock-like effect is due to the presence of toxic constituents in the sludge that are not being properly discharged out of the plant, i.e. are becoming concentrated, because of the feedback of too large a fraction of the sludge from the reactor. The shock effect would be of little concern in sludges that are low in the kinds of toxic substances that tend to become concentrated by feedback.)

Typically, shocking can start to become a danger when the donated biomass is more than about five percent (volumetrically) of the receiving biomass. However, at a biomass ratio less than that, it is predicted that there would likely be little danger of shocking. (Note that the ratio of donated feedback substance to the receiving sludge is expressed as a ratio of the respective two biomasses. Expressed this way, the different organic/water contents of donor and recipient is not relevant.)

At the other end of the scale, there can still be some benefit from feeding back reactor-sludge at lower biomass ratios. However, at a biomass ratio below about one percent, the benefits of feedback are not likely to be significant.

Of course, only a fraction of the sludge that has been through the reactor 30 is fed back into the incoming sewage. The rest of the treated sludge emerging from the reactor goes to disposal (e.g. in the manner as was described in relation to the path 29).

Figure 3:
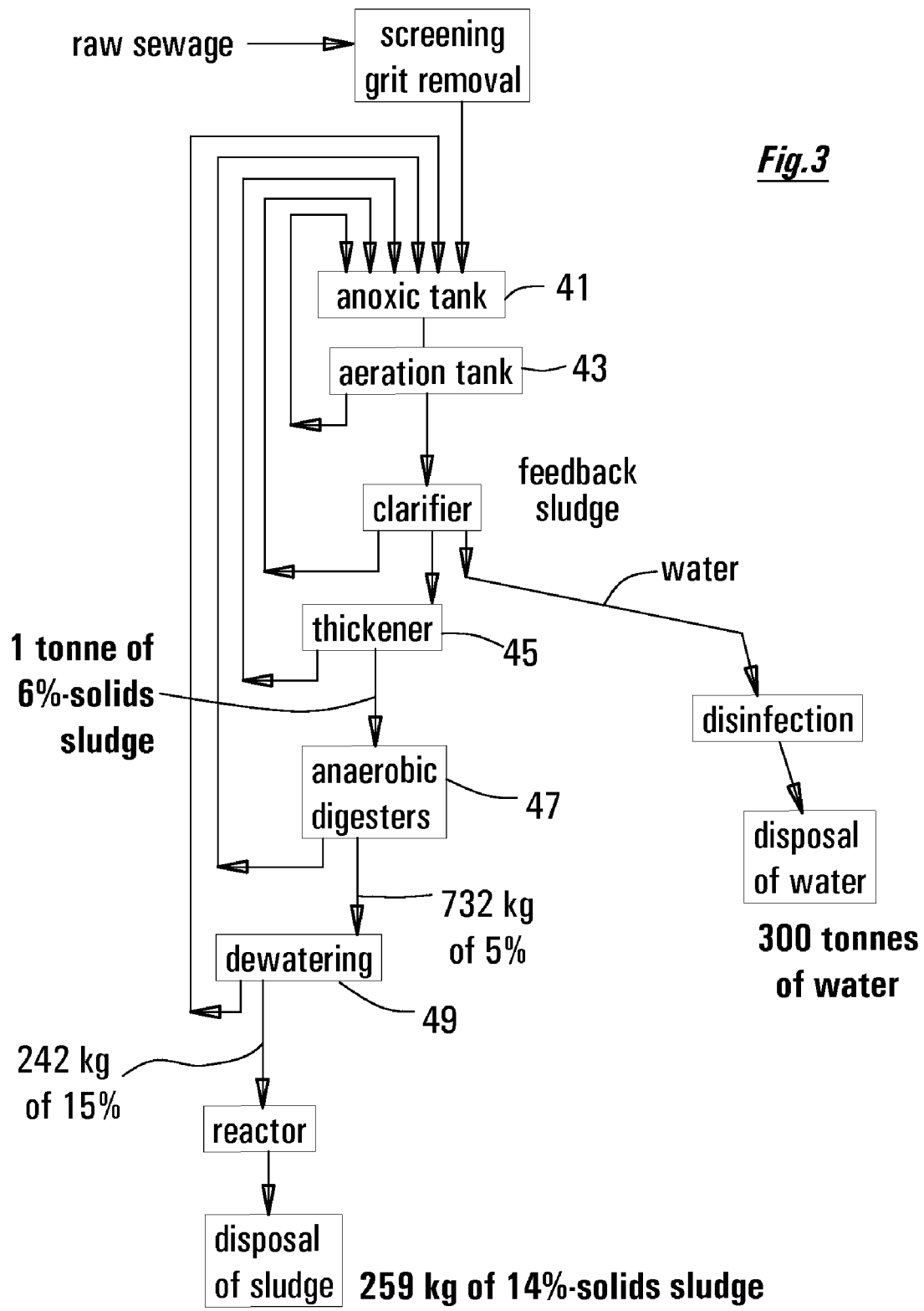
FIG. 3 is a diagram of another sewage plant that has been configured conventionally.
Figure 4:
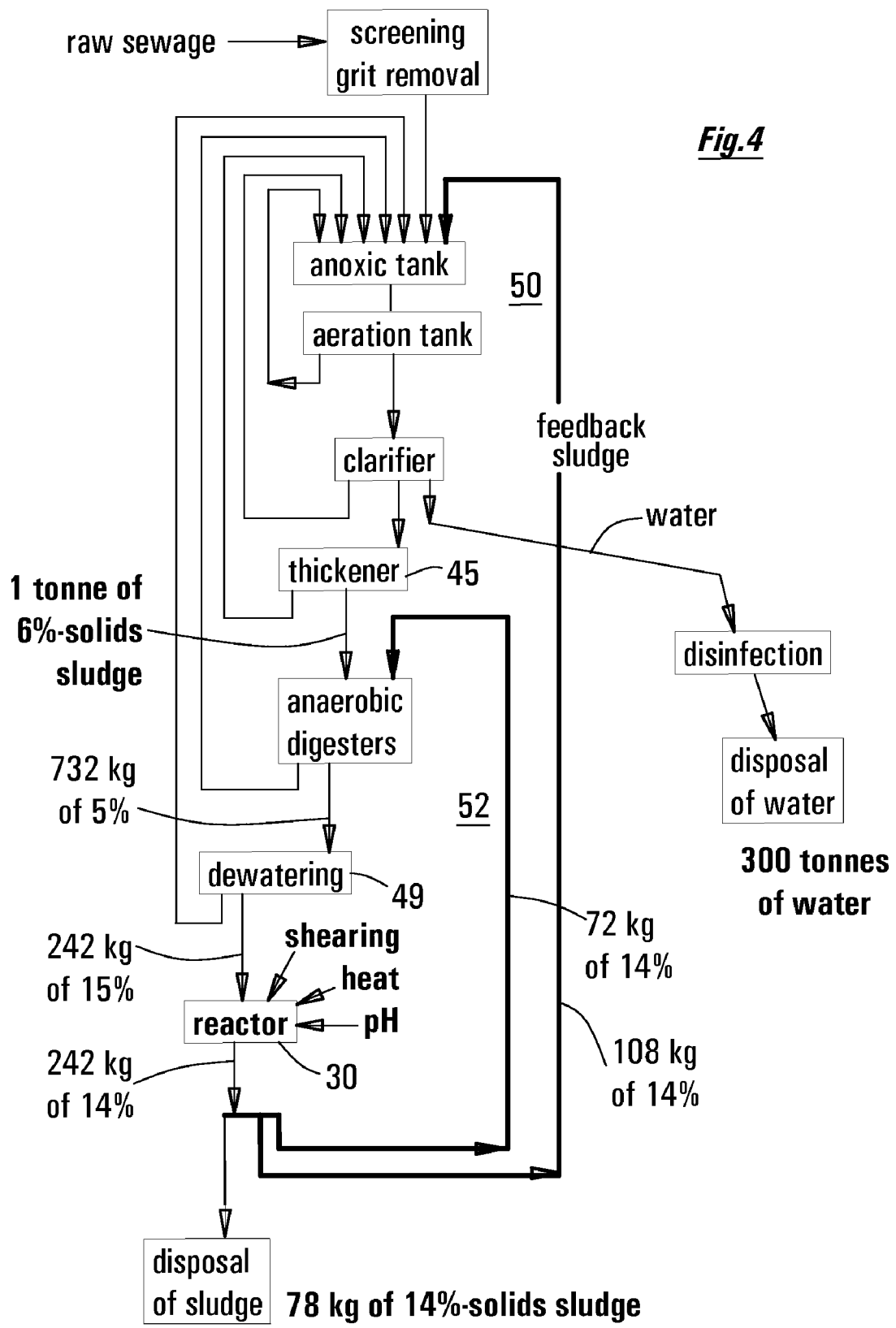
FIG. 4 is similar to FIG. 3, with the addition of further items of equipment, and further procedures applied to the sewage sludge, in accordance with the present technology.

Another example of a modification to a treatment plant is shown in FIGS. 3, 4. Reference is first made to FIG. 3, which is a diagram of a conventional sewage treatment plant arranged in the BNR (Biological Nutrient Removal) format. This plant is also configured with rather more feedback-loops than was the case in the FIG. 1 plant.

The FIG. 3 BNR plant includes an anoxic tank 41, into which the sewage is initially introduced, and an aeration basin 43, and other conventional parts of the plant are included, as in FIG. 1.

The performance attributable to the addition of the shearing reactor to the conventional BNR plant, and by feeding back a fraction of the sludge emerging from the reactor into upstream stations of the plant, may be seen by comparing the figures reported on FIG. 3 with those reported on FIG. 4. The numbers in FIGS. 3, 4 are given as examples of a treatment process applied to the sewage passing through the two plants. (It should not be understood that the quoted figures are derived from an actual physical plant, in operation; rather, the figures were extrapolated from a composite of laboratory tests and theoretical models.)

The numerical values in FIGS. 3, 4 are inter-related on the basis that one tonne of sludge, dewatered to six percent solids, enters the anaerobic digesters 38. Thus, of the overall tonne, six percent, or 60 kg, is solids. The rest, 940 kg, is liquid (mainly water). Of the 60 kg of total solids, typically 45 kg is organic biomass, and the other 15 kg is inorganic or non-organic.

In FIG. 3, the sludge is dewatered (clarified and thickened) at 45, to the extent that now the solids content has been raised to 6%. The extracted water (typically, some three hundred tonnes of it, on the same scale as the other numbers in FIG. 3) is conveyed away, e.g. back into the local water system after suitable disinfection etc.

The sludge now enters the anaerobic digesters 47. Here the biomass loses some more mass, that amount being transformed into (mainly) methane.

The sludge emerging from the digesters 47 in FIG. 2 is de-watered again, at 49, raising the solids content now to 14%. Again, the extracted water (here being 171 kg of water per tonne of the incoming sewage) is conveyed away, or is fed back to an upstream station of the plant. Thus, in FIG. 3, of the original one tonne of sludge entering the digesters, 242 kg of sludge remain to be disposed of.

(It is noted that the more traditional FIG. 1 plant results in approximately 30% more sludge having to be disposed of than is the case in the BNR plant of FIG. 3. BNR also has other benefits besides reducing the physical amount of sludge, e.g. in the areas of nitrification and de-nitrification of the sewage.)

Turning now to FIG. 4, some of the benefits of shearing the sludge, and of feeding back some of the sheared sludge, will be considered.

In FIG. 4, as in FIG. 2, the sludge, having been dewatered at the station 49, passes to a reactor 30, where the sludge is heated and sheared and its pH is raised. The sludge emerging from the reactor 30 is in the form of a highly-homogeneous liquid, having a viscosity of about 10,000 cP, or less, in which substantially all of the biomass in the sludge has now been liquidised and solubilised. Portions of this liquid sludge are fed back into the incoming sewage or sludge. Two feedback-loops are shown, one feedback-loop 50 feeding the liquidised feedback sludge into the anoxic tank 41, and the other feedback-loop 52 feeding the liquidised feedback sludge into the digesters 47.

The effect of the fed back sludge may be understood by noting that, in the conventional FIG. 2, some of the original biomass in the sludge was removed during the passage of the sludge through the anoxic tank, the aeration basin, and the anaerobic digesters. With the feedback loops, as in FIG. 4, now, some of the original 60 kg of solids have disappeared–again mainly by being transformed into gases such as methane and carbon dioxide.

Furthermore, the fact that the sludge is so thoroughly liquidised in the reactor 30 means that the sludge can be dewatered to a greater extent, prior to entering the reactor, e.g. in the thickener station 45. However, it is emphasised that, even without the extra dewatering, there is still a considerable saving in the amount of sludge that has to be disposed of that can be attributed to the act of feeding back the liquidised feedback sludge. Thus, in FIG. 4, if the dewatering station 38 only dewaters the sludge to 14% solids, as was the case in FIG. 3, the feedback still reduces the amount of sludge to be disposed of from 242 kg to 78 kg. But in FIG. 4, the sludge can be de-watered considerably beyond 14% solids, because the sludge has been liquidised—and taking some more of the water out of the sludge of course reduced the mass of the sludge still further.

Indeed, e.g. in FIG. 3, without the reactor 30 to liquidise the sludge, it might be considered that the sludge really should not be de-watered to as much as 14% solids, in that un-liquidised 14%-solids sludge is so stiff as to be very difficult to handle. However, one intent of the FIG. 3/FIG. 4 comparison was to illustrate the benefits attributable to adding the feedback-loops 50,52, and feeding back the liquidised feedback sludge, rather than to the benefits attributable simply to shearing the sludge.

It may be noted that, if the sludge in FIG. 3 were to be dewatered rather to e.g. 8% or 9% solids, the amount of sludge to be disposed of, in that modification of FIG. 2, would be significantly greater than the 242 kg shown in FIG. 3 itself. It will be understood, therefore, that the improvement attributable to de-watering the sludge to e.g. 20% solids and shearing the sludge in the reactor and feeding back the sheared liquidised sludge, would be, in most cases, significantly even greater than that shown in the comparison between FIG. 3 and FIG. 4.

Again, a major effect of feeding back the liquidised and solubilised feedback sludge, is to transform the organic substrate in the sewage, and thereby significantly increase the amount or mass by which the solids content of the sludge is reduced. Of course, the savings in the amount of sludge that has to be disposed of should not be understood to be a simple linear multiple of the number of kg of biomass converted into gases; but still, with that qualification, it might be expected that each kg of biomass that is converted to gas will lead to a reduction of between 5 kg and 10 kg in the amount of sludge that finally has to be disposed of.

The present technology provides for the feeding-back of the liquidised and solubilised feedback sludge, which action is highly effective to improve the microbiological transformation of sewage biomass into a gaseous form. Reducing the amount of sludge that has to be disposed by several tens of kg, per tonne of sewage, is significant indeed.

It will be noted that, in FIG. 4, two feedback loops are presented. It should not be understood that no further feedback loops can be made, and can be worthwhile, besides, or instead of, those illustrated.

It was mentioned above that there is a limit to how much of the sheared liquidised sludge can or should be added to the sewage or sludge being treated, given the danger of a toxic-shock-like effect. It was mentioned that no more liquidised sludge should be added than will make the donated biomass more than about ten percent of the receiving biomass. It should be understood that this limit applies to each feedback loop—i.e. the amounts are not cumulative. Thus, the ten-percent limit applies to the donation, in feedback-loop 52, of liquidised feedback sludge into the contents of the anaerobic digesters 47, and the ten percent limit applies also, independently, to the donation, in feedback-loop 50, of liquidised feedback sludge into the contents of the anoxic tank. In other words, the ten-percent limit applies to the individual single vessel into which the liquidised feedback sludge is directly donated.

Incidentally, the word "reactor", as used in this specification, should be understood to encompass two (or more) vessels, if the sludge treatment is conducted in those vessels. However, preferably the shearing should be done while the sludge is at raised temperature and raised pH, whereby the preference is for the sludge to be treated in just one vessel.

Thus far, the feeding-back procedure, in which liquidised and solubilised sludge is fed back into incoming sewage, has been described as being carried out in a water treatment plant in which the sewage is received in raw, basically untreated, form. However, the feeding-back operation can also be carried out in a treatment station that specialises in the safe disposal of sewage sludge. Here, the received sewage sludge that requires to be treated is likely to include sewage or sludge that have already been treated to some degree. Thus, a municipality might wish to operate its own sewage treatment plant, and to return the water derived therefrom back into its own local water system, but yet might wish to hand over the sludge derived from its sewage treatment plant to a facility that specialises in sludge disposal. One of the difficulties a municipality has lies in the area of being responsible or accountable for the safe disposal of its own sludge, and the notion of transferring that responsibility to a specialist concern can be an attractive one.

The technology described herein lends itself to this kind of specialist sludge disposal station, in which sewage sludge from a number of sources, having been through various types and levels of treatment, is received into the station for safe disposal. The specialist station can concentrate on the efficient transformation of sewage into fertiliser and other value-products, or on drying the sludge and incinerating it, or on rendering the sludge suitable for spreading on or injection into fields, etc, and (not least) on formulating procedures for deciding which manner of disposal is, within the limits of environmental acceptability, the most cost-effective, given the type of sludge.

In this regard, the specialist sludge disposal station can keep on hand a supply of liquidised sludge that has been prepared, as described herein, by having been passed through a reactor in which the sludge was liquidised and solubilised by being heated and violently sheared. Such sludge, being (almost) sterile, can be kept in storage for long periods (typically, several months) without (much) change in its capability to enhance, by feedback, the reduction of the organic substrate or biomass in the received incoming sludge. That is to say, the stored sludge can be mixed with the incoming fully- or partially-treated sludge, and can be expected to procure a significant reduction to the biomass content therein, and thereby a very significant reduction in the quantity of sludge that has finally to be disposed of.

As mentioned, it is not a requirement that the feedback sludge should be used immediately it has been prepared. The feedback sludge might, for example, be dried, and be stored for a few months, before use. The need for the feedback sludge to be liquidised to a viscosity of 10,000 cP should be understood as requiring that the sludge should, during its preparation, have been sheared violently enough that its viscosity was driven down to that level. It will be understood that the fact of e.g. post-liquefaction drying of the feedback sludge, even to a level of dryness at which a viscosity number becomes meaningless, does not affect the presence of the nutrients in the dried sludge, nor their bio-availability. The dried feedback sludge will rapidly release those nutrients, once it has been placed in the appropriate sewage treatment vessel.

It is also not a requirement that the feedback sludge be prepared from the same material as the sewage or sludge being treated, to which the feedback sludge is donated. Thus, the feedback sludge might have been prepared from sewage from town T in the winter, then dried, and then used to assist, by feedback, the treatment of sewage from city C the following summer. Of course, if there were components in city C's sewage for which the breakdown microbes need nutrients that are not present in the feedback sludge prepared from town T's sewage, the feedback process would not work so well on those components. Also, the use of a different source for the feedback sludge might be a problem if, for example, a particular batch of sewage includes a contaminant that needs specific microbe colonies (having special nutrient requirements) to be present in order for that contaminant to be broken down (an example would be an excess of phosphorus in the sewage), then using feedback sludge prepared from different sewage might not address that contaminant properly. But it is recognised that, generally, sludge from neighbouring towns and cities are likely to have requirements that are similar enough to each other that all the required nutrients will generally be available in feedback sludge prepared from each other's sewage.

Equally, of course, if the engineers at the specialist sludge-disposal station so decide, the liquidised sludge can also be prepared directly from the incoming partially-treated sludge. Whether pre-prepared, or prepared from the incoming sludge itself, the sludge to be fed back (i.e. the feedback substance) should have the following properties:—

The feedback sludge should have a viscosity of 10,000 centiPoise, or less. The reason for this is that a sludge that has such a viscosity is sludge that has been properly liquidised. Also, at that viscosity, the biomass has been properly solubilised, and substantially all of it has gone into solution. Alternatively, in order to be suitable for use as feedback substance, in the present technology, the sewage should have been sufficiently liquidised and solubilised that it is can be characterised as a homogeneous liquid, having the consistency of thick oil or cream. That is to say, the feedback substance is a liquid that (as previously mentioned), if a sample thereof were contained in a jar, should be capable of settling quickly to its own level, and the liquid should be capable of being poured readily from the jar, upon the jar being tipped. The substance would be regarded as too stiff (i.e. too viscous) to serve as a feedback substance if, when the jar was tipped, the material simply remained in the jar. In that case, the material would be characterised rather as a paste than as a liquid. One reason this more viscous kind of substance is unsuitable is that the engineers cannot be sure that a substance at that higher viscosity contains the nutrients in the substantially-completely-liquidised form that makes the true feedback substance so potent.

The sludge from which the feedback substance is made, prior to being placed in the reactor and liquidised, should have been de-watered to at least ten percent solids+ ninety percent liquid (water). One reason for this is that, if the sludge is or has more liquid than that, the subsequent reduction of viscosity, due to shearing, can become meaningless as regards providing an indication that the biomass component of the sludge has been properly solubilised (and has gone into solution), and that the sludge has been properly liquidised. If the sludge being sheared has a smaller solids content than ten percent, a low viscosity reading might not even indicate that the sludge has been thoroughly mixed. On the other hand, preferably the sludge should not be dewatered to more than about twenty percent solids, in that a sludge that is drier than that can hardly be reduced to a liquid of viscosity below 10,000 cP no matter how violently it is sheared.

In order to qualify as a feedback substance, the sludge should have been heated to a temperature of about sixty degrees celsius, or higher, and preferably should have been maintained at that high temperature for at least an hour. One reason for this is that, if the sludge is not so heated, although it might be properly liquidised (i.e. its viscosity has gone below 10,000 cP), its biomass content might not be fully solubilised. Preferably, the sludge should have been heated at the same time as it was being sheared; if the reactor vessel is simply provided with both a heater and a shearer, this simultaneity is easy to ensure. It would be better for the sludge to be taken up to e.g. seventy degrees celsius, or higher; generally, the higher the temperature at which the sludge is sheared, the easier and more thoroughly the biomass goes into solution. As mentioned, the biomass includes both cytoplasm and cell-walls, and especially the cell-walls component can resist entering solution at lower temperatures.

In order to qualify as a feedback substance, the pH of the sludge should have been about pH-7, or higher. Many sludges are already at that pH and no steps need be taken to increase the pH. Preferably, however, the pH should be raised to about pH-8 or pH-9 because of the ease, then, with which the biomass becomes solubilised when the sludge is sheared. One reason for the pH requirement is that, again, the cell-walls component of the biomass can resist entering solution at the lower pH levels. Again, preferably, the pH of the sludge should be maintained at the elevated value during shearing of the sludge.

The sludge should have been subjected to violent shearing, in the reactor. This is a matter of using a shearer of sufficient size and power rating, and of continuing the shearing for a long enough period of time. (The sludge may be sheared in the reactor on a continuous or semi-continuous basis, or on a batch basis.) The engineers should see to it that the kilowatts of shearing power are sufficient, in relation to the throughput of sludge through the reactor, and also that the residence time of the sludge in the reactor is sufficient, to fully and properly liquidise, homogenise, and solubilise, the sludge that is destined for use as feedback sludge.

Sufficiency, in this regard, is measured by the fact that the shearing has been done with sufficient power and energy to have liquidised the sludge down to a viscosity of 10,000 cP or lower. That is to say, the shearing should be powerful and energetic enough to take 10%-solids sludge, at 60 deg C. and pH-7, down to 10,000 cP. However, once that viscosity has been achieved, there is little point in taking the viscosity down further, in that once a 10%-solids sludge has been liquidised down to 10,000 cP, that operation has already solubilised substantially all of the substrate that can be solubilised, in the sludge in the reactor. It may be remarked that shearing has been found to be effective, in this regard, when applied to the sludge in the reactor at a rate of about twenty kilowatts per tonne of the (dewatered) sludge in the reactor, and that a batch of sludge should be sheared, in the reactor, at that level, for a period of around one hour. A power of ten kilowatts per tonne of sludge in the vessel in which shearing takes place preferably should be regarded as the minimum power. However, again, whether the shearing is or is not sufficient is measured by whether 10%-solids sludge in the reactor has been taken down to a viscosity of 10,000 cP.

On the other hand, of course the engineers might wish, for other reasons, to take the sludge in the reactor down to a viscosity that is considerably below 10,000 cP—for example because the sludge is destined to be disposed of by being injected into the ground in an agricultural field, which requires a low viscosity. If that is the case, such further lowering of the viscosity does not harm the feedback procedures described herein; also, the further-reduced viscosity (i.e. the extra shearing) might serve to enable the liquidising and solubilising to be done at (slightly) lower values of temperature and pH.

The invention claimed is:

1. Procedure for treating a suspension of biological-material in water, in a treatment plant, including:
    conveying the suspension into and through a treatment station of the treatment plant, in which the suspension undergoes a microbiological breakdown reaction;
    adding a feedback-substance, prepared as follows, into the suspension being treated in the treatment station;
    conveying the suspension, having been treated in the treatment station, out of the treatment station;
    wherein the feedback-substance is a 10%-or-higher-solids-sludge, being sewage-sludge having a solids content of about ten percent or higher, by weight; and
    the feedback-substance has the characteristics of 10%-or-higher-solids-sludge that has been placed in a reactor, in which:
        (a) the temperature of the sludge is raised to about sixty deg C. or higher for a period of time;
        (b) the pH of the sludge is maintained at a level of about pH-7 or higher, for a period of time;
        (c) the sludge is violently sheared, in the reactor, for a period of time; and
        (d) the feedback-substance is 10%-or-higher-solids-sludge in respect of which the combination of (a), (b), (c), and the respective periods of time, has been sufficient to liquidise the sludge, and sufficient to substantially solubilise biological materials in the sewage sludge from which the feedback-substance is prepared.

2. As in claim 1, wherein the sludge of the feedback-substance has been liquidised to the extent that, when a sample of the liquidised sludge is placed in a jar, and the jar is tipped, the liquidised sludge flows easily out of the jar as a homogeneous liquid.

3. As in claim 1, wherein the sludge of the feedback-substance has been liquidised to the extent that the viscosity of the liquidised sludge is about 10,000 centiPoise, or lower.

4. As in claim 1, wherein:
    the feedback-substance has the characteristics of 10%-or-higher-solids-sludge that has been placed in a reactor, in which one or more of the following conditions obtains:—
    under (a), the temperature of the sludge is raised to about seventy deg C. or higher for a period of time;
    under (b), the pH of the sludge is maintained at a level of about pH-8 or higher for a period of time;
    under (d), the feedback-substance is 12%-or-higher-solids-sludge in respect of which the combination of (a), (b), (c), and the respective periods of time, has been sufficient to drive the viscosity of the sludge down to about 6,000 centiPoise, or less.

5. As in claim 1, wherein:
    the reactor in which the sludge is sheared includes a vessel in which the sludge is contained; and
    under (c), the sludge is sheared at a power of about ten or more kilowatts per tonne of sludge in the vessel; and
    each of the periods of time is about one hour, and the said periods are substantially simultaneous.

6. As in claim 1, wherein:
    the treatment plant is a sewage treatment plant, and the suspension is sewage;
    the 10%-or-higher-solids-sludge is prepared from the suspension of biological-material in water, being sewage, that is undergoing treatment in the treatment plant.

7. As in claim 6, wherein:

the plant includes an anaerobic digester station, through which sludge derived from the sewage being treated, or the sewage, is conveyed;

in the digester station, the sludge or sewage being treated is maintained in a vessel under excluded-oxygen conditions;

in the digester station, the biological-material suspended in the sludge or sewage is transformed, by microbiological process, at least partially into methane; and the feedback-substance is mixed in with the sludge or sewage being treated in the digester station, in substantial quantity.

8. As in claim 7, wherein:

the said substantial quantity of the feedback substance is measured as the fraction of the dry weight of the added feedback-substance relative to the dry weight of the sludge or sewage in the vessel; and the said fraction is two percent or more.

9. As in claim 6, wherein:

the plant includes an aerobic digester station, through which sludge derived from the sewage being treated, or the sewage, is conveyed;

in the aerobic station, the sludge or sewage being treated is maintained in a vessel under aerated conditions;

in the aerobic station, the biological-material suspended in the sludge or sewage is transformed, by microbiological process, at least partially into carbon dioxide; and the feedback-substance is mixed in with the sludge or sewage being treated in the digester station, in substantial quantity.

10. As in claim 9, wherein:

the said substantial quantity of the feedback substance is measured as the fraction of the dry weight of the added feedback-substance relative to the dry weight of the sludge or sewage in the vessel; and the said fraction is two percent or more.

11. Procedure for treating sewage in a treatment plant, including:

conveying the sewage into and through a treatment station of the sewage treatment plant, in which the sewage being treated undergoes a microbiological breakdown reaction;

adding a feedback-substance, prepared as follows, into the sewage being treated in the treatment station;

conveying the sewage, having been treated in the treatment station, out of the treatment station, and discharging same from the treatment plant.

so de-watering the sewage sludge as to form a 10%-or-more-solids-sludge, having a solids content of about ten percent or more, by weight;

preparing the feedback-substance from the formed 10%-or-more-solids-sludge, as follows:—
  (a) maintaining the temperature of the sludge at about sixty deg C. or higher for a period of time;
  (b) maintaining the pH of the sludge at a level of about pH-7 or more for a period of time;
  (c) violently shearing the sludge, in a reactor, for a period of time;
  so combining (a), (b), (c), and the respective periods of time, as to drive the viscosity of the 10%-or-more-solids-sludge down to about 10,000 centiPoise, or less.

* * * * *